US007512682B2

(12) United States Patent
Aronoff et al.

(10) Patent No.: US 7,512,682 B2
(45) Date of Patent: Mar. 31, 2009

(54) DATABASE CLUSTER SYSTEMS AND METHODS FOR MAINTAINING CLIENT CONNECTIONS

(75) Inventors: Eyal Aronoff, Irvine, CA (US); Eyal Kalderon, Tustin, CA (US); Bill Romine, Tustin, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

(21) Appl. No.: 11/471,313

(22) Filed: Jun. 20, 2006

(65) Prior Publication Data

US 2006/0242297 A1    Oct. 26, 2006

Related U.S. Application Data

(63) Continuation of application No. 10/072,317, filed on Feb. 6, 2002, now abandoned.

(60) Provisional application No. 60/266,908, filed on Feb. 6, 2001.

(51) Int. Cl.
*G06F 15/173* (2006.01)
*G06F 15/16* (2006.01)
*G06F 17/30* (2006.01)

(52) U.S. Cl. .................. 709/225; 709/227; 707/204

(58) Field of Classification Search .............. 707/1, 707/10, 204; 709/225, 227
See application file for complete search history.

(56) References Cited

U.S. PATENT DOCUMENTS

| 4,130,867 | A | 12/1978 | Bachman et al. |
| 5,222,235 | A | 6/1993 | Hintz et al. |
| 5,297,279 | A | 3/1994 | Bannon et al. |
| 5,325,505 | A | 6/1994 | Hoffecker et al. |
| 5,333,314 | A | 7/1994 | Masai et al. |
| 5,422,979 | A | 6/1995 | Eichfeld et al. |

(Continued)

OTHER PUBLICATIONS

Computer Associates, "Platinum Tsreorg Automates Tablespace Reorganizations, Customer Story", http://platinum.com/products/custstor/tsreorg.htm. 2 pages downloaded and printed from the World Wide Web on Nov. 30, 1999.

(Continued)

*Primary Examiner*—Andrew Caldwell
*Assistant Examiner*—Benjamin Ailes
(74) *Attorney, Agent, or Firm*—Knobbe, Martens, Olson & Bear, LLP (57) ABSTRACT

Aspects of embodiments of the present disclosure include a highly available database cluster that can maintain a connection with potentially geographically remote client application programs, including non-fault tolerant application programs, even in the event of one of the database management systems (DBMS) of the cluster becoming unavailable. For example, the database cluster can advantageously move a client connection between a failing, unbalanced, or overloaded DBMS, to another DBMS within the cluster. The database cluster can include connection managers that monitor a connection between a client application program and a primary DBMS. When one connection manager determines that the primary DBMS is unavailable, the connection manager of a secondary DBMS can assume the connection to the client application as if it were the primary DBMS. The connection manager can finish all open transactions, thereby avoiding the need to roll back the same. Moreover, the connection managers can monitor the connection at the DBMS communication level, such as, for example, the SQL*Net level.

19 Claims, 3 Drawing Sheets

U.S. PATENT DOCUMENTS

| | | | |
|---|---|---|---|
| 5,423,037 | A | 6/1995 | Hvasshovd |
| 5,440,727 | A | 8/1995 | Bhide et al. |
| 5,455,945 | A | 10/1995 | VanderDrift |
| 5,551,020 | A | 8/1996 | Flax et al. |
| 5,553,303 | A | 9/1996 | Hayashi et al. |
| 5,596,747 | A | 1/1997 | Katabami et al. |
| 5,603,026 | A | 2/1997 | Demers et al. |
| 5,625,811 | A | 4/1997 | Bhide et al. |
| 5,634,052 | A | 5/1997 | Morris |
| 5,655,081 | A | 8/1997 | Bonnell et al. |
| 5,675,791 | A | 10/1997 | Bhide et al. |
| 5,721,915 | A | 2/1998 | Sockut et al. |
| 5,761,677 | A | 6/1998 | Senator et al. |
| 5,774,717 | A | 6/1998 | Porcaro |
| 5,778,377 | A | 7/1998 | Marlin et al. |
| 5,778,392 | A | 7/1998 | Stockman et al. |
| 5,796,934 | A | 8/1998 | Bhanot et al. |
| 5,799,322 | A | 8/1998 | Mosher, Jr. |
| 5,822,780 | A | 10/1998 | Schutzman |
| 5,848,416 | A | 12/1998 | Tikkanen |
| 5,893,924 | A | 4/1999 | Vakkalagadda |
| 5,933,818 | A | 8/1999 | Kasravi et al. |
| 5,933,820 | A | 8/1999 | Beier et al. |
| 5,940,832 | A | 8/1999 | Hamada et al. |
| 5,943,677 | A | 8/1999 | Hicks |
| 5,948,108 | A | 9/1999 | Lu et al. |
| 5,951,694 | A | 9/1999 | Choquier et al. |
| 5,951,695 | A | 9/1999 | Kolovson |
| 5,956,489 | A | 9/1999 | San Andres et al. |
| 5,956,504 | A | 9/1999 | Jagadish et al. |
| 5,978,594 | A | 11/1999 | Bonnell et al. |
| 5,983,239 | A | 11/1999 | Cannon |
| 5,991,761 | A | 11/1999 | Mahoney et al. |
| 5,995,958 | A | 11/1999 | Xu |
| 6,003,022 | A | 12/1999 | Eberhard et al. |
| 6,016,497 | A | 1/2000 | Suver |
| 6,026,412 | A | 2/2000 | Sockut et al. |
| 6,029,195 | A | 2/2000 | Herz |
| 6,067,545 | A | 5/2000 | Wolff |
| 6,070,170 | A | 5/2000 | Friske et al. |
| 6,119,128 | A | 9/2000 | Courter et al. |
| 6,122,640 | A | 9/2000 | Pereira |
| 6,148,410 | A * | 11/2000 | Baskey et al. .................. 714/4 |
| 6,151,607 | A | 11/2000 | Lomet |
| 6,157,932 | A | 12/2000 | Klein et al. |
| 6,199,110 | B1 * | 3/2001 | Rizvi et al. ................. 709/227 |
| 6,253,212 | B1 | 6/2001 | Loaiza et al. |
| 6,256,634 | B1 | 7/2001 | Moshaiov et al. |
| 6,289,357 | B1 | 9/2001 | Parker |
| 6,343,296 | B1 | 1/2002 | Lakhamraju et al. |
| 6,377,959 | B1 | 4/2002 | Carlson |
| 6,393,485 | B1 * | 5/2002 | Chao et al. ................... 709/231 |
| 6,411,964 | B1 | 6/2002 | Iyer et al. |
| 6,421,688 | B1 | 7/2002 | Song |
| 6,460,048 | B1 | 10/2002 | Teng et al. |
| 6,470,344 | B1 | 10/2002 | Kothuri et al. |
| 6,477,535 | B1 | 11/2002 | Mirzadeh |
| 6,519,613 | B1 | 2/2003 | Friske et al. |
| 6,523,035 | B1 | 2/2003 | Fleming et al. |
| 6,584,474 | B1 | 6/2003 | Pereira |
| 6,691,139 | B2 | 2/2004 | Ganesh et al. |
| 6,728,780 | B1 | 4/2004 | Hebert |
| 6,925,477 | B1 | 8/2005 | Champagne et al. |
| 7,003,531 | B2 | 2/2006 | Holenstein et al. |
| 7,136,918 | B2 | 11/2006 | Urano et al. |
| 2002/0091712 | A1 | 7/2002 | Martin et al. |
| 2002/0107966 | A1 * | 8/2002 | Baudot et al. ............... 709/227 |
| 2002/0111945 | A1 | 8/2002 | Young et al. |
| 2006/0143246 | A1 | 6/2006 | Phillips et al. |
| 2007/0073733 | A1 * | 3/2007 | Matthews et al. ............. 707/10 |

OTHER PUBLICATIONS

Computer Associates, "platinum OnlineReorg Technical Overview, OnlineReorg", http://platinum.com/products/dba/onreo)to.htm, 5 pages downloaded and printed from the World Wide Web on Nov. 30, 1999.

Computer Associates, "ProVision Tsreorg for Oracle, Brochure, Database Utilities TSreorg for Oracle", http://platinum.com/products/brochure/provis/pv_dr.htm, 4 pages downloaded and printed from the World Wide Web on Nov. 30, 1999.

Computer Associates, "rapid Reorg for DB2 for OS/390, Brochure", http://platinum.com/products/brochure/dm/b_rrd.htm, 3 pages downloaded and printed from the World Wide Web on Nov. 30, 1999.

"Space Management and Reorganization: Challenges and Solutions," http://www.quest.com/whitepapers/space_manager_wp.doc, published on or around Dec. 21, 1999.

"Top Five Tips for Space Management and Reorganization," believed to be published after Jul. 21, 1998.

"Quest SharePlex for Oracle," Brochure, Quest Software, Inc., Nov. 1999, 4 pages.

OnWire Technologies, Inc. NetRecorder Administrator's Guide, Version 2.1, pp. 1-38.

OnWire Technologies, Inc. NetRecorder User's Guide, Version 2.1, 1999, pp. 1-138.

* cited by examiner

DATABASE CLUSTER SYSTEMS AND METHODS FOR MAINTAINING CLIENT CONNECTIONS

REFERENCE TO RELATED APPLICATIONS

The present application is a continuation of, and claims benefit of priority under 35 U.S.C. § 120 from, U.S. patent application Ser. No. 10/072,317, filed Feb. 6, 2002, now abandoned claims priority benefit under 35 U.S.C. §119(e) from U.S. Provisional Application No. 60/266,908, filed Feb. 6, 2001, entitled "HIGHLY AVAILABLE DATABASE CLUSTERS," each of which is hereby incorporated herein by reference in its entirety.

BACKGROUND OF THE INVENTION

1. Field of the Invention

The present invention relates to the field of highly available database clusters. More specifically, the invention relates to database clusters that transparently move client connections between hosts.

2. Description of the Related Art

A database is generally considered to be a collection of information or data organized in a way that computer programs can quickly access or select desired portions of the collection. A database management system (DBMS) includes the collection of computer programs that enable the quick storage, selection, modification, and extraction of desired portions of data from the database. Exemplary DBMSs include those commercially available from Oracle Corporation, IBM, or the like. Application programs, on the other hand, typically include client programs that connect to a DBMS to provide users the ability to interact with the data of the database, such as, for example, to select, modify, organize, delete, or the like, some or all of the foregoing data. Exemplary application programs include payroll or inventory programs, online stores, or the like.

Often, the application programs are designed to be continually connected to a DBMS, thereby having substantially continuous access to data stored within the same. Unless specifically coded to recover, these application programs typically fail when their connection to the DBMS fails or is otherwise unavailable, such as during a system failure. For many application program environments, this failure is undesirable.

System designers have created various solutions to reduce the effects of an application program losing a connection to a DBMS. For example, system designers often employ database clusters to offer backup solutions to failed systems. Database clusters can include two or more DBMSs accessing shared data files. For example, the shared data files can include data files having the same set of data from the replication of changes from one DBMS to another. Also, the shared data files can include multiple DBMSs that access the same physical storage. Through the shared data files, system designers allow one DBMS to replace another in the event of a failure.

There are several drawbacks associated with the foregoing database clustering solution, especially when employed in environments allowing for little or no down time, such as, for example, high availability solutions. For example, when a DBMS fails, the connection from the application program to the DBMS can be lost, thereby potentially losing all open transactions from the same. Additionally, data not replicated from a failing DBMS can be lost. Moreover, during load balancing, simultaneous updates of the same data on different DBMSs can occur in some replication solutions. Also, a large amount of communication traffic among a cluster, and/or hardware limitations of the same, can reduce the cost effectiveness of geographically diverse systems. Moreover, as discussed, the failure of an individual DBMS results in a failure of non-fault tolerant program applications.

On the other hand, system designers may also employ application servers in order to reduce the effects of losing a connection to a DBMS. For example, system designers often have application programs connect to an application server, where the application server includes the functionality to recover lost client connections to one or more secondary DBMSs within a database cluster. However, the application server generally includes a proprietary protocol used in communications from the application program to the application server. The proprietary protocol is generally not native to the DBMS and therefore, each connecting application program will first be routed through the application server. Thus, the application server solution is not well suited for geographically diverse storage systems.

Embodiments of the present invention seek to overcome some or all of these and other problems.

SUMMARY OF THE INVENTION

Therefore, a need exists for a database cluster that can maintain a connection with potentially geographically remote client application programs, including non-fault tolerant application programs, even in the event of a failure or other unavailability of the primary DBMS. Accordingly, aspects of embodiments of the present disclosure include a highly available database cluster that can maintain a connection with potentially geographically remote client application programs, including non-fault tolerant application programs. For example, the database cluster can advantageously move a client connection between a failing, unbalanced, or overloaded DBMS, to another DBMS within the database cluster.

According to one embodiment, the database cluster includes connection managers which monitor a connection between a client application program and a primary DBMS. When one connection manager determines that the primary DBMS is unavailable, has an unbalanced share of the workload of the cluster, or the like, the connection manager of a secondary DBMS can assume the connection to the client application as if it were the primary DBMS. For example, the connection manager can finish all open transactions, thus avoiding the need to roll back the same. Embodiments of the connection managers can also monitor the connection at the DBMS communication level, such as, for example, the SQL*Net level. According to one embodiment, the connection managers capture enough information about the connection to restore the connection to its current state on another DBMS in the cluster.

Based on the foregoing, an aspect of an embodiment of the invention includes a data processing system comprising a database cluster which can move a connection between a remote client and a first DBMS within the cluster to a second DBMS within the cluster when the database cluster determines that the first DBMS has failed, wherein the movement of the connection is transparent to the remote client and the connection includes communication in a protocol native to the first and second DBMSs, such as, for example, SQL*Net.

Another aspect of an embodiment of the invention includes a data processing system comprising a database cluster which can move a connection between a remote client and a first DBMS to a second DBMS when the database cluster determines that the first DBMS is executing an unbalanced portion of the cluster workload, wherein the movement of the connection is transparent to the remote client.

Another aspect of an embodiment of the invention includes a method of moving a client connection from a first DBMS to a second DBMS. The method comprises monitoring a state of a client connection to a first DBMS, wherein the client connection includes communication in a protocol native to the first DBMS. The method also comprises detecting a condition of the connection which indicates the connection should be moved, and moving the client connection to a second DBMS without the client dropping the client connection.

For purposes of summarizing the invention, certain aspects, advantages and novel features of the invention have been described herein. Of course, it is to be understood that not necessarily all such aspects, advantages or features will be embodied in any particular embodiment of the invention.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

Aspects of embodiments of the present disclosure include a highly available database cluster that can move connections with one or more client program applications from a first host to a second in the event of, for example, a failure of the first host, an unbalanced or overloaded workload present on the first host, or the like. Additionally, the cluster can provide communication in the native protocol of underlying database management systems (DBMSs), thereby providing fault tolerant connections for potentially geographically remote and potentially non-fault tolerant client application programs.

According to one embodiment, the database cluster includes connection managers that monitor a connection between a client application program and a primary DBMS. When one connection manager determines that the primary DBMS is unavailable, has an unbalanced share of the workload of the cluster, or the like, the connection manager of a secondary DBMS can assume the connection to the client application as if it were the primary DBMS. In one embodiment, the assumption of the connection by the secondary connection manager is transparent to the client. Moreover, the secondary connection manager can replay or finish all open transactions, thus picking up the connection to the client in a state exactly where the primary DBMS failed. Embodiments of the connection managers can also monitor a connection at the DBMS communication level, such as, for example, the SQL*Net level. According to one embodiment, the connection managers capture enough information about the connection to restore the connection to its current state on another DBMS in the cluster.

According to one embodiment, the connection manager monitors a current state of TCP and IP protocols of a TCP/IP connection. When one connection manager determines that it should assume the TCP/IP connection, the connection manager continues the TCP conversation that the client originally started with the other connection manager.

The foregoing solution advantageously provides a database cluster offering high availability to its connecting clients, including non-fault tolerant clients, by moving connections between DBMSs within a database cluster.

To facilitate a complete understanding of the invention, the remainder of the detailed description describes the invention with reference to the drawings, wherein like reference numbers are referenced with like numerals throughout.

Figure 1:
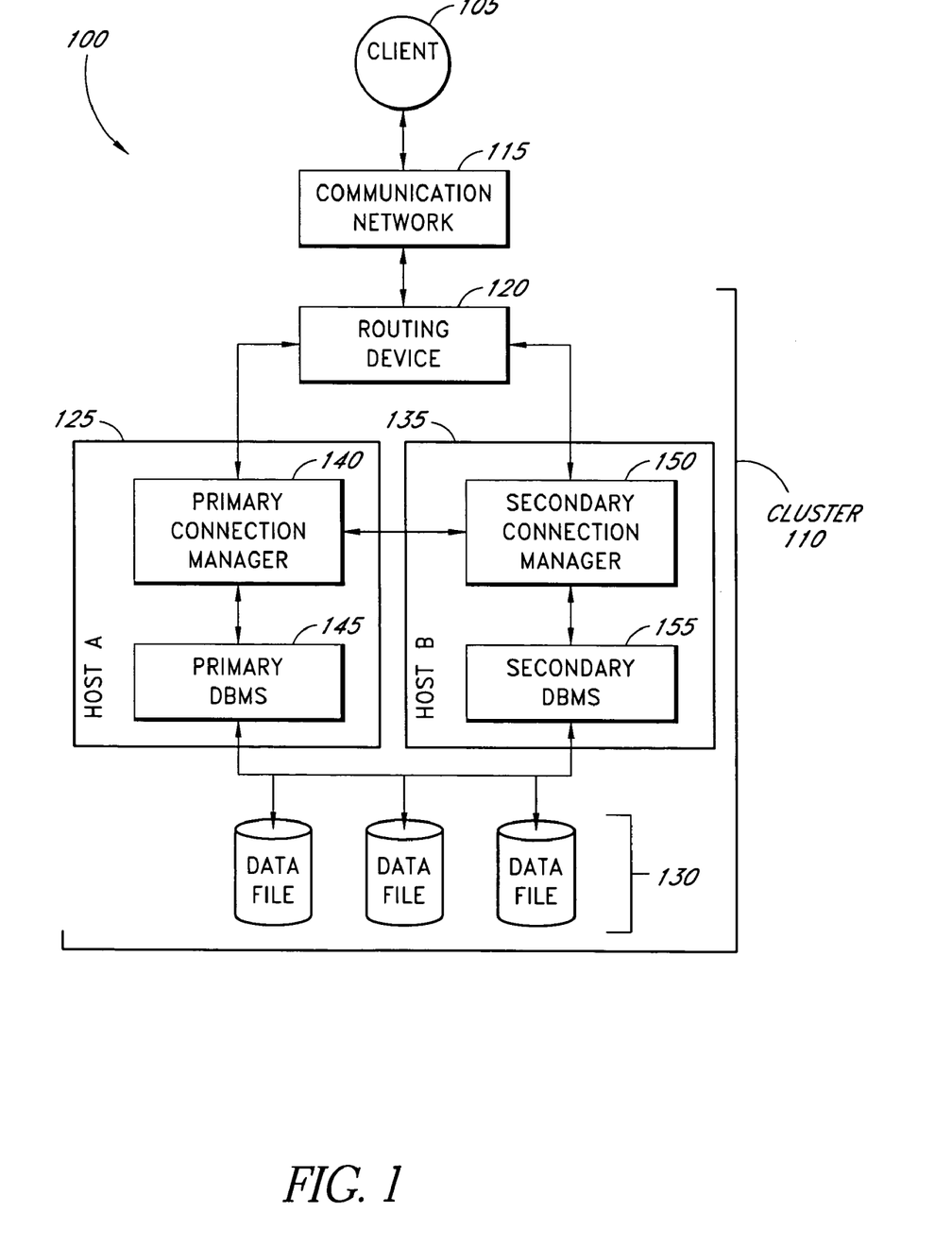
FIG. 1 illustrates a block diagram of an exemplary data processing system including a database cluster according to embodiments of the invention.

FIG. 1 illustrates a block diagram of an exemplary data processing system 100, according to an embodiment of the invention. As shown in FIG. 1, the data processing system 100 includes a client application program 105 (client 105) communicating with a highly available database cluster 110 (cluster 110) through a communication network 115. According to one embodiment, the client 105 comprises computer programs such as payroll or inventory programs, online stores, human resource applications, or the like, executing on one or more remote computer devices or systems.

An artisan will recognize from the disclosure herein that the client 105 can comprise virtually any client program designed to connect with a DBMS to interact with data stored therein, such as, for example, to select, modify, organize, delete, index, or the like, some or all of the foregoing data. Moreover, the artisan will recognize from the disclosure herein that the client 105 can execute on a wide variety of computer devices, such as, for example, personal digital assistants, mobile telephones, handheld computer devices, laptop computers, workstations, mainframe computers, combinations of the same, or the like.

The cluster 110 can comprise two or more DBMSs, able to access portions of shared, replicated, or otherwise mirrored data. Exemplary DBMSs include those commercially available from Oracle Corporation, IBM, or the like. According to one embodiment, the DBMSs of the cluster 110 execute on one or more hosts or other computing devices.

The communication network 115 comprises some or all of the Internet. However, an artisan will recognize from the disclosure herein that the communications network 115 can include a wide range of interactive communications mediums. For example, the communications network 115 can include interactive television networks, telephone networks, wireless data transmission systems, two-way cable systems, customized computer networks, interactive kiosk networks, automatic teller machine networks, direct links, private local or wide area networks, and the like.

In one embodiment, the client 105 connects to the cluster 110 through the communication network 115. The client 105 issues instructions or transactions including one or more operational statements to be carried out against data stored in data files accessible by the cluster 110. When the cluster 110 has executed the instructions or transactions, the cluster 110 returns an indication of the same to the client 105. Moreover, the cluster 110 can move the foregoing connection with the client 105 from a first host to a second in the event of, for example, a failure of the first host, an unbalanced or overloaded workload present on the first host, or the like. Additionally, the cluster 110 can provide communication in the native protocol of the underlying two or more DBMSs, thereby providing fault tolerant connections for the potentially geographically remote and potentially non-fault tolerant client 105. For example, the cluster 110 can monitor a connection at the DBMS communication level, such as, for example, a SQL*Net level. The cluster 110 can capture enough information about the connection to restore the connection to its current state on another DBMS in the cluster.

FIG. 1 also shows the cluster 110 including a routing device 120 communicating with a primary host 125 (Host A 125) to execute transactions against one or more shared data files 130. Additionally, FIG. 1 shows the routing device 120 having the ability to communicate with a secondary host 135 (Host B 135), which in turn also includes the ability to execute transactions against the one or more shared data files 130. According to one embodiment, Host A 125 includes a primary connection manager 140 and a primary DBMS 145, while Host B 135 includes a secondary connection manager 150 and a secondary DBMS 155. FIG. 1 also shows the primary connection manager 140 communicating with the secondary connection manager 150.

Routing device 120 comprises a device, such as, for example, a router, hub, or the like, that connects any number of computing systems or networks. Generally, routing device 120 uses information in data packets, along with a forwarding table to determine where the data packets go. According to one embodiment, the routing device 120 is configured in such as fashion as to forward all packets destined for the database cluster 110 to both the primary connection manager 140 and the secondary connection manager 150. An artisan will recognize that the function of such routing will be to enable a virtual IP address (VIP) that may be shared between hosts.

In one embodiment, the routing device 120 sends all data packets from the client 120 to both the primary connection manager 140 and the secondary connection manager 150. The secondary connection manager monitors statistics related to, for example, the number of clients connected to the primary connection manger. The primary connection manager assumes responsibility for the data packets send from the client 105 to the primary DBMS 145. Thus, when the client 105 sends transactions, in the form of data packets, through the communication network 115 to the primary DBMS 145, the data packets are routed to the primary connection manager 140, forming a connection between the primary connection manager 140 and the client 105. The primary connection manager 140 then forwards the data packets to the primary DBMS 145, forwards a copy of the data packets to the secondary connection manager 150, and monitors statistics related to, for example, the number of connected clients and the status of the secondary connection manager 150. Meanwhile, the secondary connection manager 150 receives the copied data packets, holds them in memory, and monitors statistics related to, for example, the number of connected clients and the status of the primary connection manager 140.

The primary DBMS 145 receives the data packets from the primary connection manager 140, assembles them into operational statements of transactions, and executes the same against the data files 130. The primary DBMS 145 then returns the requested data and/or acknowledgment of the received data packets back to the primary connection manager 140, which in turns forwards a copy to the secondary connection manager 150 and a copy to the respective client 105 through the communication network 115.

In an embodiment, the secondary connection manager 150 can detect a condition of the connection between the primary connection manager 140 and the client 105 from the statistics being monitored. For example, the secondary connection manager 150 can detect a failure of the connection, an unbalanced or overloaded workload on the primary connection, or the like. In such circumstances, the secondary connection manager assumes control of the connection and replays any rolled back transactions against the data files 130 through the secondary DBMS 155 as follows.

The secondary connection manager 150 communicates with the routing device 120 to acknowledge TCP requests from the client 105 to the primary connection manager 140. These acknowledgements advantageously keep the client TCP connection from timing out and failing. Additionally, the secondary connection manager 150 replays any operational statements of transactions rolled back due to, for example, the failure of the primary connection. As is generally known in the art, upon failure of a DBMS, all operational statements of open transactions (for, example, non-committed transactions) executed against the data files 130 are rolled back as if they never occurred. However, because the operational statements of open transactions are stored in the foregoing memory of the secondary connection manager 150, these operational statements from open transactions can be reexecuted against the data files 130 through the secondary DBMS 155. After replaying the foregoing operational statements, the secondary connection manager 150 begins forwarding data packets from the client 105 to the secondary DBMS 155 to be executed against the data files 130.

Based on the foregoing disclosure, the database cluster 110 advantageously moves a connection between the primary DBMS 145 and the client 105 to the secondary DBMS 155 in the cluster 110, when the primary DBMS 145 fails, becomes unbalanced, overloaded, or the like. Additionally, the database cluster 110 advantageously replays any rolled back statements of open transactions during fail-over to the secondary DBMS 155, thereby providing an assumption of the connection that is transparent to the client 105. Accordingly, the cluster 110 avoids failure of non-fault tolerant clients by moving the connection rather than allowing it to fail. Additionally, the cluster 110 advantageously provides communication in the native protocol of the underlying two or more DBMSs, thereby providing fault tolerant connections for the potentially geographically remote and potentially non-fault tolerant client 105.

Figure 2:
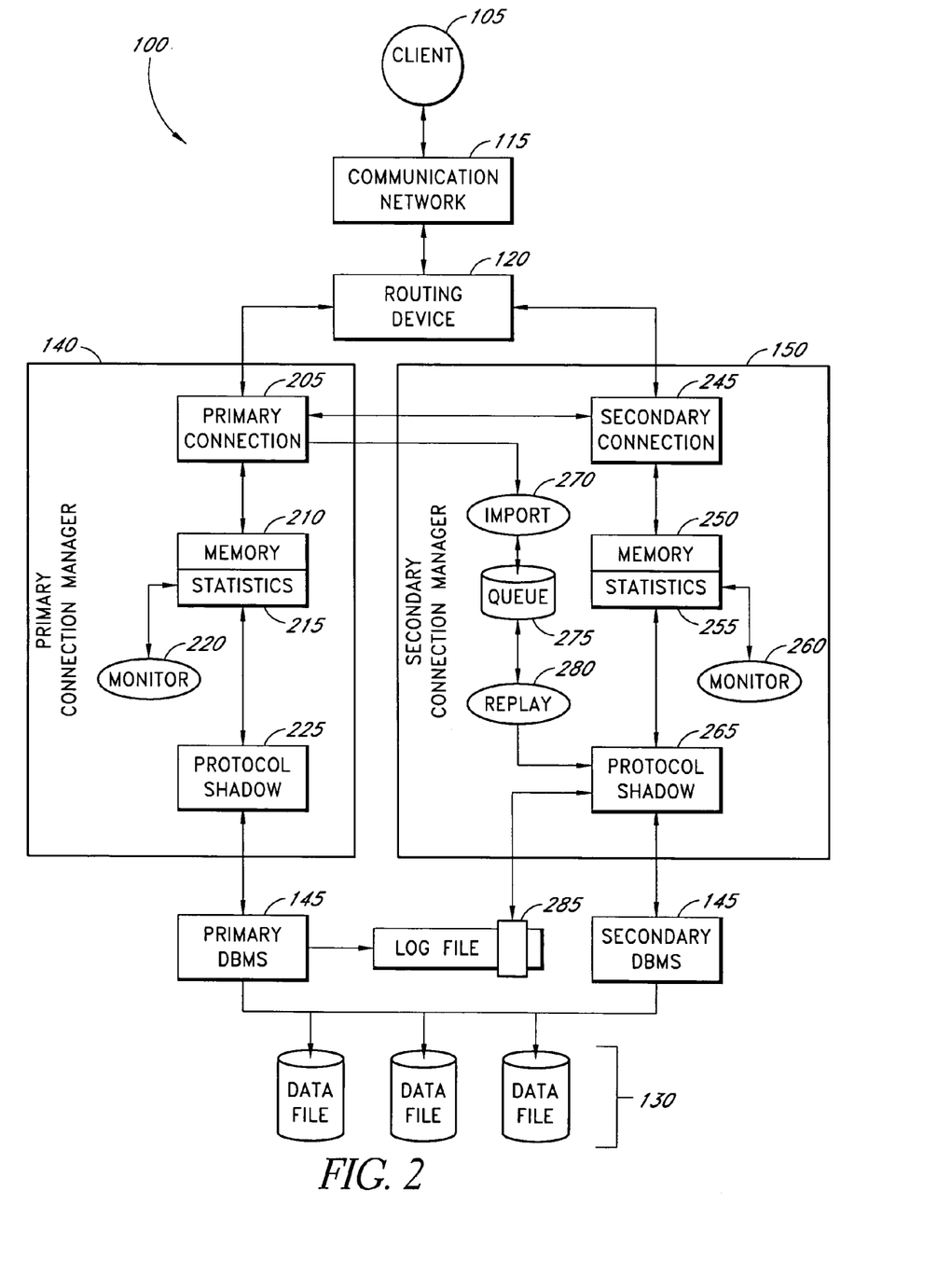
FIG. 2 illustrates a block diagram of exemplary connection managers of the database cluster of FIG. 1, according to embodiments of the invention.

FIG. 2 illustrates a block diagram of embodiments of the primary and secondary connection managers, 140 and 150, of the cluster 110, according to embodiments of the invention. FIG. 2 shows the primary connection manager 140 including a primary connection 205 communicating with a memory 210 including statistics 215, a monitor process 220 also communicating with the memory 210, and a protocol shadow 225 communicating with the memory 210 and the primary DBMS 145. Moreover, FIG. 2 shows the secondary connection manager 150 including a secondary connection 245 communicating with a memory 250 including statistics 255, a monitor process 260 also communicating with the memory 250, and a protocol shadow 265 communicating with the memory 250 and the secondary DBMS 155. In addition, the secondary connection manager 150 includes an import process 270 communicating with the primary connection 205 and a queue 275. The secondary connection manager 150 also includes a replay process 280 communicating with the queue 275 and the protocol shadow 265. Moreover, while not shown, an additional redo monitor can access one or more log files 285 associated with the primary DBMS 145. The redo monitor also can communicate with the memory 210 and review the statistics 215. FIG. 2 also shows the protocol shadow 265 accessing the one or more log files 285.

The following simplified exemplary transactions are disclosed to provide an understanding of the operation of the primary and secondary connection managers, 140 and 150 respectively, however, they are not intended to limit the scope of the disclosure. Rather, an artisan will recognize from the disclosure herein, alternative arrangements to simplify or expand one or more of the features or aspects disclosed herein.

Normal Operation

When the client 105 begins a transaction by issuing an operational statement to be applied against the data files 130, the client 105 distributes the statement across one or more data packets. The data packets are forwarded through the communication network 115 to the routing device 120, where, as disclosed, the routing device 120 forwards the packets to the primary connection 205 and to the secondary connection 245. The primary connection 205 examines statistics in the statistics 215 generated by the redo monitor. These statistics include, for example, the current location of transaction being stored in the log files 285. The primary connection transmits a copy of each data packet along with the current log file location, such as a sequence number, to the import process 270 of the secondary connection manager 150, and places a copy in the memory 210. The import process 270 stores the data packets in the queue 275. The protocol shadow 225 accesses the memory 210 and retrieves the data packets. The protocol shadow 225 forwards the packets to the primary DBMS 145, where the packets are assembled and the operational statement executed against the data files 130. Moreover, as is generally known in the art, the DBMS can also keep a record or log of the executed statement, generally in the log file 285.

The DBMS 145 forwards a result of the statement and/or and acknowledgement of receipt of the same, back to the protocol shadow 225, preferably in one or more acknowledgement data packets. The protocol shadow 225 transfers the data packets back to the memory 210, where they are picked up by the primary connection 205. The primary connection 205 forwards a copy of the data packets to the import process 270 and to the client 105. Thus, the client 105 receives the results and/or acknowledgement of the transmitted statement of an open transaction.

The client 105 may then desire to finalize, or commit the transaction against the data files 130. In such case, the client 105 issues a commit statement, which is forwarded to the primary DBMS 145 and the import process 270, along with the subsequent result and/or acknowledgement, in a manner similar to that disclosed. In one embodiment, the protocol shadow 225 stores sufficient data from the data packets that it can assemble the statements of a given transaction. When the protocol shadow 225 determines the data packets for a commit statement have been sent to the primary DBMS 145, the protocol shadow attaches a marker to the result/acknowledgement data packets associated with the primary DBMS 145 acknowledging execution of the commit statement. According to one embodiment, the marker comprises a location marker, such as, for example, a sequence number from the primary DBMS 145. Then, as disclosed, the result/acknowledgement data packets are transmitted with their marker to the import process 270. According to one embodiment, the import process 270 recognizes the marker placed on the data packets associated with the commit statement, and recognizes that the entire transaction has been executed by the primary DBMS 145 against the data files 130. Therefore, the import process 270 deletes the data packets associated with the now finalized transaction from the queue 275.

Based on the foregoing, the protocol shadow 225 and the import process 270 advantageously work together to ensure that only the data packets associated with open transactions remain in the queue 275.

The primary connection 205 also stores the statistics 215 related to the connection with the client 105 in the memory 210. In one embodiment, the statistics include sufficient information for the monitor process 220 to determine whether the primary connection 205 has failed, is processing an unbalanced or overloaded workload, or the like, and whether the secondary connection 245 has failed, is processing an unbalanced or overloaded workload, or the like. For example, the statistics 215 can include the number of clients seen by the primary connection 205, the number of clients seen by the secondary connection 245, the status of communication with secondary communication manager 150, or the like. The primary connection 205 acquires the statistics 215 corresponding to information from the secondary connection manager 150 through the connection between the primary connection 205 and the secondary connection 245. Moreover, according to one embodiment, the foregoing status of the secondary communication manger 150 can be ascertained through straightforward ping or ping-like commands.

Fail-Over

Figure 3:
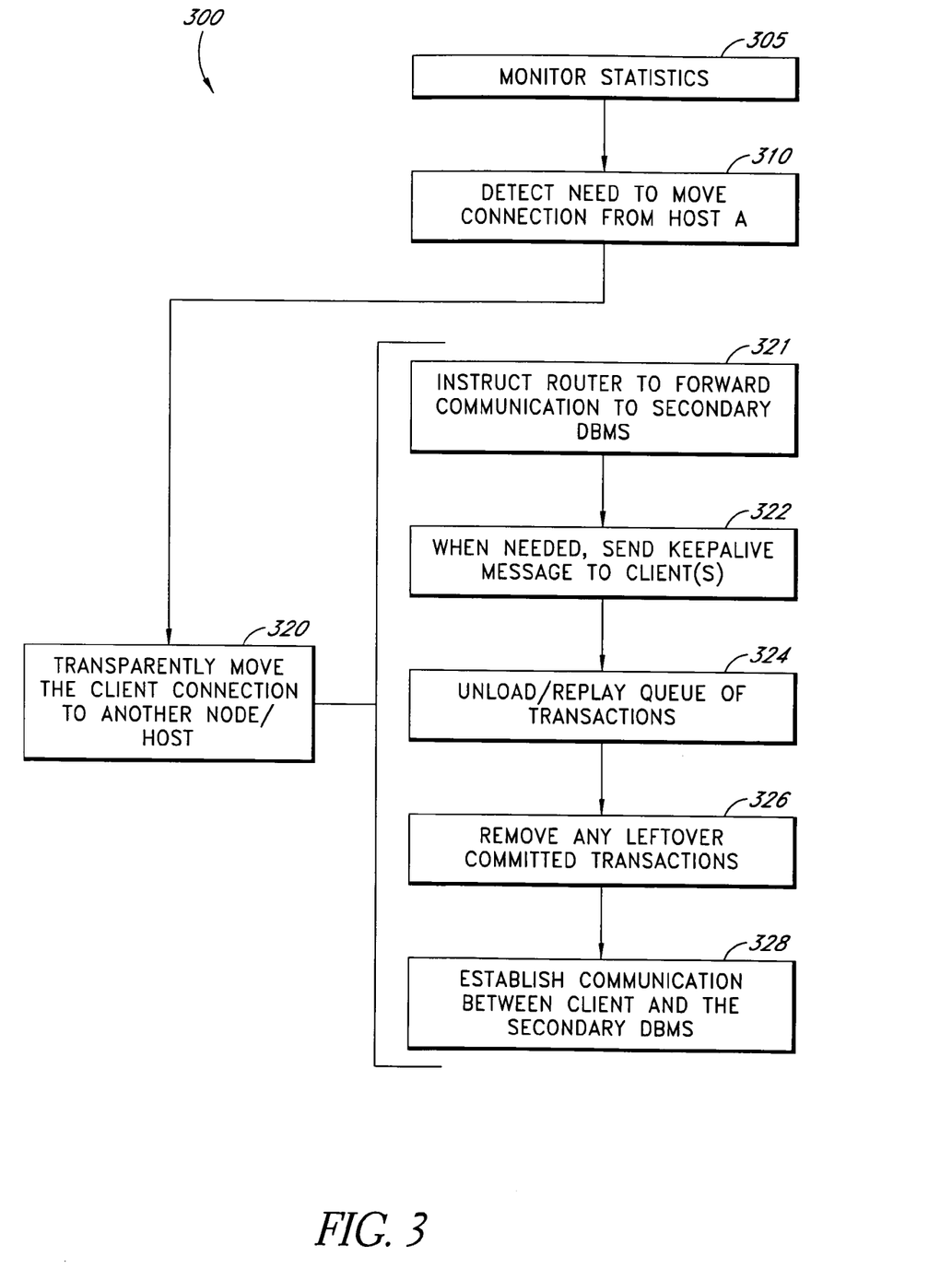
FIG. 3 illustrates a flow chart of a fail-over process, according to embodiments of the invention.

FIG. 3 illustrates a flow chart of a fail-over process 300, according to embodiments of the invention. As shown in FIG. 3, the fail-over process 300 begins with BLOCK 305 where the cluster 110 monitors the statistics of one or more connections with one or more clients. In the foregoing example, the monitoring corresponds to the monitor processes 220 and 260. In BLOCK 310, the cluster 110 detects the need to move the connection from one DBMS to another. For example, the monitor 260 may determine that the primary DBMS 145 has failed, become unbalanced, overloaded, or the like, and determine that the secondary connection manager 150 should assume the connection with the client 105. When the determination that a connection move is desired, the fail-over process 300 proceeds to BLOCK 320, where the cluster 110 moves the connection from one DBMS to another without losing the connection or causing even a non-fault tolerant client to fail. For example, the secondary connection 245 can communicate with the routing device 120 to assume the IP address (or VIP) of the primary DBMS 145. Additionally, the secondary connection manager 150 can replay all statements of open transactions which were rolled back in the data files 130. Accordingly, the move is transparent to the client 105 who does not lose the connection and does not know that a change has been made.

According to one embodiment, BLOCK 320 can include SUBBLOCK 321, where the cluster 110 instructs the routing device 120 to forward communication from the client to another DBMS. For example, as disclosed, the secondary connection 245 can assume the IP address of the primary DBMS 145. BLOCK 320 can also include SUBBLOCK 322, where the cluster 110 can send a keepalive message to one or more clients to ensure against failure of the connection to the same. According to one embodiment, the client 105 resends data packets. which are not responded to or otherwise acknowledged by the cluster 110. When the client 105 resends the same data packets a predetermined amount of times, the client 105 may register a failure of the connection, thereby causing non-fault tolerant clients (such as those clients not programmed to recover) to also fail. Thus, during the fail-over process 300, the cluster 110 can respond to the client 105 with a message or acknowledgement that keeps the client 105 from resending the same data packets, therefore keeping the client from determining that the connection has failed. According to one embodiment, the secondary connection 245 sends the foregoing keepalive messages.

BLOCK 320 of the fail-over process 300 can also include SUBBLOCK 324 where the cluster 110 replays any statements from open transactions that were rolled back during the failure of the primary DBMS 145. For example, the replay process 280 can access the queue 275 to retrieve data packets associated with rolled back transactions and to forward them to the protocol shadow 265. For example, as disclosed in the foregoing, the import process 270 removes the statements associated with all finalized or committed transactions, thereby leaving only rolled back transactions in the queue 275.

BLOCK 320 of the fail-over process 300 can also include SUBBLOCK 326 where the cluster 110 removes any leftover committed transactions that may have slipped through. For example, it is possible that Host A 125 can fail after the primary DBMS 145 executes a commit statement for a particular transaction, but before the result/acknowledgement of the same can be transmitted to the import process 270. Thus, the secondary connection manager 150 believes the statements associated with the foregoing transaction were rolled back, e.g., because they were left in the queue 275, and therefore, the replay process 280 will forward the already committed statements to the protocol shadow 265. In one embodiment, the protocol shadow 265 parses the log file 285 of the primary DBMS 145 to ensure a commit statement associated with the open transaction was not received. When the protocol shadow 265 determines that a commit statement was received, the protocol shadow 265 deletes the statements associated therewith before their associated data packets are forwarded to the secondary DBMS 155 to be executed against the data files 130.

BLOCK 320 of the fail-over process 300 can also include SUBBLOCK 328 where the cluster 110 establishes communication between the client and the secondary DBMS. For example, after all rolled back statements are either executed against the data files 130 through the secondary DBMS 155 or deleted from the queue 275 by the protocol shadow 265, the protocol shadow 265 begins accessing new data packets stored in the memory 250 by the secondary connection 245 after it assumed the connection to the client 105 from the primary connection manager 140. Thus, after bringing the secondary DBMS 155 back up to the point of failure of the primary DBMS 145, the secondary connection manager 150 performs operations similar to the normal operations of the primary connection manager 140 as disclosed above.

According to one embodiment, the system administrator of the database cluster 110 can designate whether the secondary connection manager 150 through the monitor process 260 fails-back to the primary connection manager 140 after the cause of failure of the same is repaired, or whether the secondary connection manager 150 simply becomes the primary and vice versa.

Although the foregoing invention has been described in terms of certain preferred embodiments, other embodiments will be apparent to those of ordinary skill in the art from the disclosure herein. For example, the data packets captured from the primary connection manager 140 can be replicated to other DBMSs by replaying the same on the other DBMSs. This replication has several advantages over other replication techniques including a potential reduction in the traffic keeping the database cluster synchronized, thereby advantageously providing economical replication of geographically diverse data files.

The captured data packets can also be used to assist a transaction log based replication system. For example, the data packets can be directed to the other databases in the cluster prior to committing the transactions. Accordingly, committed transactions on a particular DBMS are not lost when the DBMS fails, as these transactions may advantageously be replayed on the other DBMSs in the cluster.

The captured data packets can also be used to assist a transaction log based replication system when posting replicated modifications. Some modifications (such as a vertical table update or DDL operation) may be difficult to replicate via a log-based replication. When the original data packets are available, posting the original SQL rather than the data from the transaction log may be more efficient and straightforward.

According to another embodiment, software may be added just below the client 105, thereby providing a mechanism to replay incomplete transactions. For example, a typical client application does not access the database directly, but instead uses some type of intermediate layer such as ODBC or JDBC, OCI, or the like. The foregoing added software can advantageously replace this intermediate layer.

Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. A database cluster comprising:
   a first computing system, the first computing system further comprising:
      a primary connection manager that forms a Transmission Control Protocol/Internet Protocol (TCP/IP) connection with and receives transactions from at least one client, and
      a primary database management system (DBMS) that executes the transactions on data stored in one or more data files; and
   a second computing system, the second computing system further comprising:
      a secondary connection manager, the secondary connection manager configured to exchange state information with the primary connection manager about the TCP/IP connection, and
      a secondary DBMS that communicates with the secondary connection manager and that can access data stored in the one or more data files,
      wherein when the secondary connection manager determines that a particular condition is met with respect to performance of the first computing system, the secondary connection manager uses the state information exchanged with the primary connection manager to transparently assume the TCP/IP connection with the at least one client by replaying against the data, through the secondary DBMS, incomplete portions of open transactions executed on the data and receiving additional transactions from the at least one client for execution on the data.

2. The database cluster of claim 1, wherein the particular condition comprises an unbalanced workload between the first and second computing systems, and wherein the secondary connection manager is configured to monitor the performance of the first computing system to determine when the unbalanced workload exists.

3. The database cluster of claim 2, wherein the primary connection manager is configured to monitor the performance of the second computing system.

4. The database cluster of claim 1, wherein the state information includes the number of clients connected to the primary connection manager.

5. The database cluster of claim 1, wherein the secondary connection manager further comprises a queue that stores copies of the transactions sent to the primary connection manager by the at least one client.

6. The database cluster of claim 5, wherein the secondary connection manager further comprises an import process that deletes from the queue data packets associated with transactions that have been committed by the primary DBMS.

7. The database cluster of claim 1, wherein the state information is indicative of data packets associated with database transactions.

8. The database cluster of claim 7, wherein the one or more data files comprise shared storage of a plurality of database servers.

9. The database cluster of claim 1, further comprising a router device configured to forward the transactions from the at least one client to each of the primary and secondary connection managers.

10. A method of providing a fail-over database cluster, the method comprising:
    forming a Transmission Control Protocol/Internet Protocol (TCP/IP) connection between a first computing system and at least one client;
    receiving transactions from the at least one client with a primary connection manager of the first computing system;
    executing the transactions with a primary database management system (DBMS) of the first computing system on data stored in one or more data files;
    exchanging state information, about the TCP/IP connection, between the primary connection manager and a secondary connection manager of a second computing system, wherein the first and second computing systems are part of the same network; and
    transparently assuming the TCP/IP connection with the second computing system by using the state information received from the primary connection manager when a predetermined condition exists with respect to at least one of the first and second computing systems, wherein said transparently assuming further comprises:
        replaying against the data, through a secondary DBMS of the second computing system, rolled-back transactions previously executed on the data,
        receiving with the secondary connection manager of the second computing system additional transactions from the at least one client, and
        executing the additional transactions against the one or more data files.

11. The method of claim 10, additionally comprising sending with the secondary connection manager at least one keepalive message to the at least one client.

12. The method of claim 10, wherein said monitoring comprises exchanging statistics between the first computing system and the second computing system.

13. The method of claim 12, wherein the statistics comprise the number of clients connected to the first computing system.

14. The method of claim 10, additionally comprising deleting from a queue of the second computing system data packets associated with transactions committed. by the primary DBMS.

15. A database cluster for providing for client connection fail-over, the database cluster comprising:
    first means for forming a Transmission Control Protocol/Internet Protocol (TCP/IP) connection with a client computer, wherein said first means is further configured to receive transactions from the client computer;
    second means for receiving the transactions from said first means and for executing the transactions on data stored in at least one data file;
    third means for monitoring the TCP/IP connection between said first means and the client computer, for exchanging state information with said first means regarding TCP and IP protocols of the TCP/IP connection, and for transparently assuming the TCP/IP connection with the client computer while keeping the client TCP/IP connection alive from a perspective of the client based on the state information; and
    fourth means for accessing the data stored in the at least one data file, said fourth means being in communication with said third means, wherein said transparently assuming comprises replaying against the data, with said fourth means, uncommitted partial transactions executed on the data.

16. The database cluster of claim 15, wherein said third means is configured to transparently assume the TCP/IP connection with the client computer when said third means detects a failure of the TCP/IP connection between said first means and the client computer.

17. The database cluster of claim 15, wherein said third means is configured to transparently assume the TCP/IP connection with the client computer when said third means detects a failure of said second means.

18. The database cluster of claim 15, wherein said third means is configured to transparently assume the TCP/IP connection with the client computer when said third means detects an unbalanced workload between said second means and said fourth means.

19. The database cluster of claim 15, wherein said third means further comprises means for storing copies of transactions received from the client computer by said first means.

* * * * *